United States Patent
Wolf et al.

(10) Patent No.: US 9,089,838 B2
(45) Date of Patent: Jul. 28, 2015

(54) CATALYST AND METHOD FOR THE PRODUCTION OF CHLORINE BY GAS PHASE OXIDATION

(75) Inventors: Aurel Wolf, Wülfrath (DE); Leslaw Mleczko, Dormagen (DE); Oliver Felix-Karl Schlüter, Leverkusen (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 13/818,527

(22) PCT Filed: Aug. 22, 2011

(86) PCT No.: PCT/EP2011/064370
§ 371 (c)(1),
(2), (4) Date: May 7, 2013

(87) PCT Pub. No.: WO2012/025483
PCT Pub. Date: Mar. 1, 2012

(65) Prior Publication Data
US 2013/0216470 A1    Aug. 22, 2013

(30) Foreign Application Priority Data

Aug. 25, 2010    (DE) .................. 10 2010 039 735

(51) Int. Cl.
| | | |
|---|---|---|
| *C01B 7/00* | (2006.01) | |
| *B01J 27/13* | (2006.01) | |
| *B01J 27/135* | (2006.01) | |
| *B01J 23/00* | (2006.01) | |
| *B01J 23/40* | (2006.01) | |
| *B01J 23/42* | (2006.01) | |
| *B01J 23/62* | (2006.01) | |
| *B01J 23/14* | (2006.01) | |
| *B01J 35/10* | (2006.01) | |
| *B01J 37/02* | (2006.01) | |
| *B01J 37/08* | (2006.01) | |
| *C01B 7/04* | (2006.01) | |
| *B01J 37/00* | (2006.01) | |

(52) U.S. Cl.
CPC ............... *B01J 23/626* (2013.01); *B01J 23/14* (2013.01); *B01J 35/1014* (2013.01); *B01J 37/0201* (2013.01); *B01J 37/0207* (2013.01); *B01J 37/08* (2013.01); *C01B 7/04* (2013.01); *B01J 37/0009* (2013.01)

(58) Field of Classification Search
CPC ........ B01J 23/626; B01J 27/13; B01J 27/135; C01B 7/01; C01B 7/096; C01B 7/14

USPC .................. 502/227, 230, 326, 352; 423/502
See application file for complete search history.

(56) References Cited

U.S. PATENT DOCUMENTS

| | | | |
|---|---|---|---|
| 3,873,469 A * | 3/1975 | Foster et al. ................... 502/242 |
| 4,076,792 A * | 2/1978 | Foster et al. ............... 423/213.5 |
| 4,519,954 A * | 5/1985 | Burrington et al. ........... 558/363 |
| 5,593,935 A * | 1/1997 | Golunski et al. ............... 502/339 |
| 5,908,607 A | 6/1999 | Abekawa et al. |
| RE37,663 E * | 4/2002 | Golunski et al. ............... 502/339 |
| 6,551,960 B1 * | 4/2003 | Laine et al. .................... 502/327 |
| 7,056,856 B2 * | 6/2006 | Summers et al. ............. 502/302 |
| 7,572,543 B2 * | 8/2009 | Mei et al. ....................... 429/483 |
| 7,985,709 B2 * | 7/2011 | Jordan et al. .................. 502/326 |
| 8,475,755 B2 * | 7/2013 | Dang et al. ................. 423/240 S |
| 2002/0172640 A1 | 11/2002 | Hibi et al. |
| 2003/0144143 A1 * | 7/2003 | Jordan et al. .................. 502/330 |
| 2006/0088459 A1 * | 4/2006 | Upchurch et al. .......... 423/213.5 |
| 2007/0078053 A1 * | 4/2007 | Schryer et al. ................ 502/324 |
| 2007/0238605 A1 * | 10/2007 | Strehlau et al. ................. 502/60 |
| 2007/0274897 A1 | 11/2007 | Wolf et al. |
| 2007/0292336 A1 | 12/2007 | Wolf et al. |
| 2008/0267849 A1 | 10/2008 | Haas et al. |
| 2008/0279738 A1 * | 11/2008 | Strehlau et al. ............ 423/213.5 |
| 2008/0287282 A1 | 11/2008 | Haas et al. |
| 2009/0181285 A1 * | 7/2009 | Kikuchi et al. ................. 429/40 |
| 2009/0239736 A1 * | 9/2009 | Schmidt et al. ................. 502/37 |
| 2010/0113260 A1 * | 5/2010 | Hagemeyer ................... 502/185 |
| 2010/0190642 A1 * | 7/2010 | Schryer et al. ................ 502/339 |

FOREIGN PATENT DOCUMENTS

| | | |
|---|---|---|
| DE | 1567788 A1 | 5/1970 |
| DE | 19734412 A1 | 2/1998 |
| DE | 19748299 A1 | 5/1998 |
| DE | 102007020154 A1 | 11/2007 |
| DE | 102007020096 A1 | 10/2008 |
| DE | 102007020142 A1 | 10/2008 |
| EP | 0936184 A2 | 8/1999 |
| GB | 1046313 A | 10/1966 |
| WO | WO-2007134721 A2 | 11/2007 |
| WO | WO-2007134772 A1 | 11/2007 |

OTHER PUBLICATIONS

International Search Report for PCT/EP2011/064370 mailed Feb. 21, 2012.

* cited by examiner

*Primary Examiner* — Cam N. Nguyen
(74) *Attorney, Agent, or Firm* — Drinker Biddle & Reath LLP

(57) ABSTRACT

The present invention relates to a catalyst for preparation of chlorine by catalytic gas phase oxidation of hydrogen chloride with oxygen, in which the catalyst comprises calcined tin dioxide as a support and at least one halogen-containing ruthenium compound, and to the use thereof.

17 Claims, No Drawings

CATALYST AND METHOD FOR THE PRODUCTION OF CHLORINE BY GAS PHASE OXIDATION

RELATED APPLICATIONS

This application is a national stage application (under 35 U.S.C. §371) of PCT/EP2011/064370, filed Aug. 22, 2011, which claims benefit of German Patent Application No. 10 2010 039 735.0, filed Aug. 25, 2010.

The invention proceeds from known processes for preparing chlorine by catalytic gas phase oxidation of hydrogen chloride with oxygen, in which the catalyst comprises tin dioxide as a support and at least one halogen- and/or oxygen-containing ruthenium compound. The invention relates to the calcination of the tin dioxide prior to application of the catalytically active material, to a catalyst composition and to the use thereof.

The process developed by Deacon in 1868 for catalytic hydrogen chloride oxidation with oxygen in an exothermic equilibrium reaction was at the genesis of industrial chlorine chemistry:

$$4HCL + O_2 \Rightarrow 2Cl_2 + 2H_2O$$

Chloralkali electrolysis, however, eclipsed the Deacon process to a substantial degree. Virtually all chlorine was produced by electrolysis of aqueous sodium chloride solutions [Ullmann Encyclopedia of industrial chemistry, seventh release, 2006]. However, the attractiveness of the Deacon process has been increasing recently, since global chlorine demand is growing faster than the demand for sodium hydroxide solution. This development is favorable for the process for preparing chlorine by oxidation of hydrogen chloride decoupled from the preparation of sodium hydroxide solution. In addition, hydrogen chloride is obtained as a coproduct in large amounts in phosgenation reactions, for instance in isocyanate preparation.

The oxidation of hydrogen chloride to chlorine is an equilibrium reaction. The equilibrium position shifts with increasing temperature to disfavor the desired end product. It is therefore advantageous to use catalysts with maximum activity which allow the reaction to proceed at relatively low temperature.

As the current state of the art, ruthenium-based catalysts are used for HCl oxidation. The first catalysts for hydrogen chloride oxidation with ruthenium as the catalytically active component were described as early as 1965 in DE 1 567 788, in this case proceeding from $RuCl_3$, for example supported on silicon dioxide and aluminum oxide. Further Ru-based catalysts with ruthenium oxide or mixed ruthenium oxide active as the active composition and various oxides as the support material, for example titanium dioxide, zirconium dioxide, etc. were described in DE-A 197 48 299. DE-A 197 34 412 and EP 0 936 184 A2.

In addition, documents WO 2007/134772 A1 and WO 2007/134772 A1 disclose ruthenium-based catalyst systems which are supported on tin dioxide and whose activity clearly stands out from the previous prior art.

However, a disadvantage of the catalyst systems claimed in WO 2007/134772 A1 and WO 2007/134721 A1 is that, under the reaction conditions of the HCl gas phase oxidation, tin is discharged from the support material, probably in the form of the volatile compound $SnCl_4$. This is negative particularly for the lifetime of the catalysts, since the mechanical stability is gradually reduced by the advancing loss of tin. An additional factor is that the tin chloride discharged has to be removed from the product. Accordingly, there is a need for a process which increases the chemical stability of the catalysts known from WO 2007/134772 A1 and WO 2007/134721 A1 with respect to the discharge of tin, without impairing the superior activity thereof.

It is thus an object of the present invention to increase the chemical stability of the catalysts known from WO 2007/134772 A1 and WO 2007/134721 A1 with respect to the discharge of tin, without impairing the superior activity thereof. The object is achieved by a calcination of the tin dioxide-containing support component prior to the application of the catalytically active material.

It has now been found that, surprisingly, the controlled calcination of the tin dioxide-containing support prior to the application of the catalytically active material can increase both the chemical stability of the catalyst under the reaction conditions of the HCl gas phase oxidation and the activity.

The invention provides a catalyst composition comprising at least tin dioxide as a support material and at least one ruthenium-containing compound as a catalytically active material, characterized in that the support material has been subjected, prior to the application of the catalytically active material, to a calcination in the presence of oxidizing gases, especially in the presence of air, at a temperature of at least 450° C.

In a preferred embodiment, tin dioxide is used as the support for the catalytically active component, tin dioxide being in the cassiterite structure.

The invention also further provides a process for preparing chlorine by catalytic gas phase oxidation of hydrogen chloride with oxygen over a solid catalyst, in which the catalyst comprises at least tin dioxide as a support material and at least one ruthenium-containing compound as a catalytically active material, characterized in that the support material, prior to the application of the catalytically active material, is calcined in the presence of oxidizing gases, especially in the presence of air, at a temperature of at least 450° C.

According to the invention, the catalytically active component used is at least one ruthenium-containing compound. This is especially a ruthenium halide, ruthenium hydroxide, ruthenium oxide, ruthenium oxyhalide and/or ruthenium in metallic form.

Preference is given to a catalyst composition in which the ruthenium compound is a halogen- and/or oxygen-containing ruthenium compound.

The catalytically active component used is preferably a halogen-containing ruthenium compound. This is, for example, a compound in which halogen has ionic to polarized covalent bonding to a ruthenium atom.

The halogen in the preferred halogen-containing ruthenium compound is preferably selected from the group consisting of chlorine, bromine and iodine. Particular preference is given to chlorine.

The halogen-containing ruthenium compound includes those which consist exclusively of halogen and ruthenium. Preference is given, however, to those which contain both oxygen and halogen, especially chlorine or chloride. Particular preference is given to a catalyst composition in which the catalytically active ruthenium compound is selected from the group of: ruthenium chloride, ruthenium oxychloride and a mixture of ruthenium chloride and ruthenium oxide and especially a ruthenium oxychloride compound.

Particular preference is given to using at least one ruthenium oxychloride compound as the catalytically active species. A ruthenium oxychloride compound in the context of the invention is a compound in which both oxygen and chlorine have ionic to polarized covalent bonding to ruthenium. Such a compound thus has the general composition $RuO_xCl_y$. Preferably, various ruthenium oxychloride compounds of this kind may present alongside one another in the catalyst. Examples of defined particularly preferred ruthenium oxychloride compounds include especially the following compositions: $Ru_2Cl_4$, $Ru_2OCl_2$, $Ru_2OCl_2OCl_5$ and $Ru_2OCl_6$.

In a particularly preferred process, the halogen-containing ruthenium compound is a mixed compound corresponding to the general formula $RuCl_xO_y$, in which x is a number from 0.8 to 1.5 and y is a number from 0.7 to 1.6.

The catalytically active ruthenium oxychloride compound in the context of the invention is preferably obtainable by a process which comprises firstly the application of a solution or suspension, especially an aqueous solution or suspension, of at least one halogen-containing ruthenium compound to the calcined, tin dioxide-containing support and the removal of the solvent.

Other conceivable processes include the chlorination of nonchlorinated ruthenium compounds, such as ruthenium hydroxides, before or after the application of the ruthenium compound to the support.

A preferred process includes the application of an aqueous solution of $RuCl_3$ to the support.

The temperature in the course of calcination of the support material prior to the application of the catalytically active material is preferably at least 700° C., more preferably 700° C. to 1100° C. The duration of the calcination of the support material prior to the application of the catalytically active material is preferably 0.5 h to 10 h, more preferably 1 h to 6 h. The oxidizing gases in the calcination of the support material prior to the application of the catalytically active material preferably contain oxygen in the range from 10% by volume to 50% by volume, more preferably 15 to 25% by volume.

If the calcination of the support material prior to the application of the catalytically active material is effected at excessively high temperatures (e.g. >1500° C.) or for too long a period at suitable temperatures, chemical stability is also increased, but sintering also results in a progressive reduction in BET surface area and, associated with this, in the activity of the catalyst which forms, under some circumstances.

The application of the ruthenium compound is generally followed by a drying step, appropriately in the presence of oxygen or air, in order at least partly to enable conversion to the preferred ruthenium oxychloride compounds. In order to prevent conversion of the preferred ruthenium oxychloride compounds to ruthenium oxides, the drying should preferably be conducted at less than 280° C., especially at at least 80° C., more preferably at least 100° C. The drying time is preferably 10 min to 6 h. The catalysts can be dried under standard pressure or preferably under reduced pressure.

A preferred process is characterized in that the catalyst is obtainable by loading a tin dioxide-containing support, which has been calcined prior to application of the active material, with a halogen-containing ruthenium compound and calcining it at a temperature of at least 200° C., preferably at least 240° C., more preferably at least 250° C. to 650° C., especially in an oxygen-containing atmosphere, more preferably under air. The calcination time is preferably 30 min to 24 h.

In a particularly preferred process, the proportion of ruthenium from the catalytically active ruthenium compound in relation to the overall catalyst composition, especially after calcination, is 0.5 to 5% by weight, preferably 1.0 to 4% by weight, more preferably 1.5 to 3% by weight.

If the catalytically active species applied are to be halogen-ruthenium compounds which do not contain any oxygen, it is also possible to dry at higher temperatures with exclusion of oxygen.

The catalyst is preferably obtainable by a process which comprises the application of an aqueous solution or suspension of at least one halogen-containing ruthenium compound to the calcined tin dioxide-containing support component and subsequent drying at less than 280° C., and subsequent activation under the conditions of the gas phase oxidation of hydrogen chloride, in the course of which substantial conversion to the ruthenium oxychlorides takes place. The longer the drying period in the presence of oxygen, the more oxychloride is formed.

In a particularly preferred variant, an oxygen-containing ruthenium compound is applied to the support. This is a compound in which oxygen has ionic to polarized covalent bonding to a ruthenium atom. This compound is prepared by the application of an aqueous solution or suspension of at least one halide-containing ruthenium compound to the calcined tin dioxide and subsequent precipitation by means of an alkaline compound to give ruthenium hydroxide, and optionally the calcination of the precipitated product.

The precipitation can be conducted under alkaline conditions to directly form the oxygen-containing ruthenium compound. It can also be performed under reducing conditions with primary formation of metallic ruthenium, which is subsequently calcined with supply of oxygen to form the oxygen-containing ruthenium compound.

A preferred process includes application by impregnation, soaking etc. of an aqueous solution of $RuCl_3$ to the calcined tin dioxide-containing support component.

The application of the halide-containing ruthenium compound is generally followed by a precipitation step and a drying or calcination step, which is appropriately effected in the presence of oxygen or air at temperatures of up to 650° C.

More preferably, the catalytic component, i.e. the ruthenium-containing compound, can be applied to the support, for example by moist and wet impregnation of a support with suitable starting compounds present in solution or starting compounds in liquid or colloidal form, precipitation and coprecipitation processes, and ion exchange and gas phase coating (CVD, PVD).

The inventive catalysts for hydrogen chloride oxidation are notable for a high activity and a high stability at low temperatures.

Preferably, as already described above, the novel catalyst composition is used in the catalytic process known as the Deacon process. In this process, hydrogen chloride is oxidized with oxygen in an exothermic equilibrium reaction to chlorine, forming water vapor. The reaction temperature is typically 180 to 500° C., more preferably 200 to 450° C., especially preferably 250 to 420° C.; the customary reaction pressure is 1 to 25 bar, preferably 1.2 to 20 bar, more preferably 1.5 to 17 bar, most preferably 2 to 15 bar. Since the reaction is an equilibrium reaction, it is appropriate to work at minimum temperatures at which the catalyst still has a sufficient activity. It is also appropriate to use oxygen in superstoichiometric amounts relative to hydrogen chloride. For example, a two- to four-fold oxygen excess is typical. Since there is no risk of any selectivity losses, it may be economically advantageous to work at relatively high pressure and correspondingly with a longer residence time relative to standard pressure.

Suitable catalysts may contain, in addition to the ruthenium compound, also compounds of other metals or noble metals, for example gold, palladium, platinum, osmium, iridium, silver, copper, chromium or rhenium.

The catalytic hydrogen chloride oxidation can preferably be performed adiabatically or isothermally or virtually isothermally, batchwise but preferably continuously, as a fluidized bed or fixed bed process, preferably as a fixed bed process, more preferably adiabatically at a reactor temperature of 180 to 500° C., preferably 200 to 450° C., more preferably 250 to 420° C., and a pressure of 1 to 25 bar (1000 to 25 000 hPa), preferably 1.2 to 20 bar, more preferably 1.5 to 17 bar and especially preferably 2.0 to 15 bar.

Typical reaction apparatuses in which the catalytic hydrogen chloride oxidation is performed are fixed bed or fluidized bed reactors. The catalytic hydrogen chloride oxidation can preferably also be performed in a plurality of stages.

In the adiabatic, isothermal or virtually isothermal process regime, but preferably in the adiabatic process regime, it is also possible to use a plurality of, especially 2 to 10, preferably 2 to 6, reactors connected in series with intermediate cooling. The hydrogen chloride can either be added completely together with the oxygen upstream of the first reactor or distributed over the different reactors. This series connection of individual reactors can also be combined in one apparatus.

A further preferred embodiment of an apparatus suitable for the process consists in using a structured catalyst bed in which the catalyst activity rises in flow direction. Such a structuring of the catalyst bed can be accomplished through different impregnation of the catalyst supports with active material or through different dilution of the catalyst with an inert material. The inert materials used may, for example, be rings, cylinders or spheres of titanium dioxide, zirconium dioxide or mixtures thereof, aluminum oxide, steatite, ceramic, glass, graphite or stainless steel. In the case of the preferred use of shaped catalyst bodies, the inert material should preferably have similar external dimensions.

Suitable shaped catalyst bodies include shaped bodies with any desired forms, preference being given to tablets, rings, cylinders, stars, wagonwheels or spheres, particular preference being given to rings, cylinders, spheres or star extrudates, as the form. Preference is given to the spherical form. The size of the shaped catalyst bodies, for example diameter in the case of spheres or maximum cross-sectional width, is, on average, especially 0.3 to 7 mm, very preferably 0.8 to 5 mm.

Alternatively to the above-described finely divided (shaped) catalyst bodies, the support may also be a monolith of support material, for example not just a "conventional" support body with parallel channels not connected radially to one another; also included are foams, sponges or the like, with three-dimensional connections within the support body to form the monoliths, and support bodies with crossflow channels.

The monolithic support may have a honeycomb structure, or else an open or closed cross-channel structure. The monolithic support possesses a preferred cell density of 100 to 900 cpsi (cells per square inch), more preferably of 200 to 600 cpsi.

A monolith in the context of the present invention is disclosed, for example, in "Monoliths in multiphase catalytic processes—aspects and prospects", by F. Kapteijn, J. J. Heiszwolf T. A. Nijhuis and J. A. Moulijn, Cattech 3, 1999, p. 24.

Suitable additional support materials or binders for the support are particularly, for example, silicon dioxide, graphite, titanium dioxide with rutile or anatase structure, zirconium dioxide, aluminum oxide or mixtures thereof, preferably titanium dioxide, zirconium oxide, aluminum oxide or mixtures thereof, more preferably γ- or δ-aluminum oxide or mixtures thereof. A preferred binder is aluminum oxide or zirconium oxide. The proportion of binder may, based on the finished catalyst, be 1 to 30% by weight, preferably 2 to 25% by weight and very preferably 5 to 20% by weight. The binder increases the mechanical stability (strength) of the shaped catalyst bodies.

In a particularly preferred variant of the invention, the catalytically active component is present essentially on the surface of the actual support material, for example of the tin dioxide, but not on the surface of the binder.

For additional doping of the catalysts, suitable promoters are alkali metals or metal compounds such as lithium, sodium, potassium, rubidium and cesium, preferably lithium, sodium and potassium, more preferably potassium, alkaline earth metals such as magnesium, calcium, strontium and barium, preferably magnesium and calcium, more preferably magnesium, rare earth metals such as scandium, yttrium, lanthanum, cerium, praseodymium and neodymium, preferably scandium, yttrium, lanthanum and cerium, more preferably lanthanum and cerium, or mixtures thereof.

The promoters may, without being restricted thereto, be applied to the catalyst by impregnation and CVD processes, preference being given to impregnation, for example of metal compounds, especially chlorides and/or nitrates, and special preference being given to combined application with the catalytic main component.

The conversion of hydrogen chloride in the HCl oxidation in single pass can preferably be limited to 15 to 90%, preferably 40 to 90%, more preferably 70 to 90%. Unconverted hydrogen chloride can, after removal, be recycled partly or fully into the catalytic hydrogen chloride oxidation. The volume ratio of oxygen to hydrogen chloride at the reactor inlet is preferably 1:2 to 20:1, preferably 2:1 to 8:1, more preferably 2:1 to 5:1.

The heat of reaction of the catalytic hydrogen chloride oxidation can advantageously be utilized to raise high-pressure steam. This steam can be utilized to operate a phosgenation reactor and/or distillation columns, especially isocyanate distillation columns.

In a further step, the chlorine formed is removed. The removal step typically comprises a plurality of stages, specifically the removal and optional recycling of unconverted hydrogen chloride from the product gas stream of the catalytic hydrogen chloride oxidation, the drying of the resulting stream comprising essentially chlorine and oxygen, and the removal of chlorine from the dried stream.

Unconverted hydrogen chloride and steam formed can be removed by condensing aqueous hydrochloric acid out of the product gas stream of the hydrogen chloride oxidation by cooling. Hydrogen chloride can also be absorbed in dilute hydrochloric acid or water.

The invention further provides for the use of calcined tin dioxide as a catalyst support for a catalyst in the catalytic gas phase oxidation of hydrogen chloride with oxygen.

The invention further provides for the use of the novel catalyst composition as a catalyst, especially for oxidation reactions, more preferably as a catalyst in the catalytic gas phase oxidation of hydrogen chloride with oxygen.

The examples which follow illustrate the present invention:

EXAMPLES

The essential indices and results from the examples which follow are summarized in a table after the last example.

Example 1

Inventive

Calcination of $SnO_2$ 5 g of commercial $SnO_2$ (Cfm Oskar Tropitzsch e. K. (CFM), batch 631, 500 mesh) were calcined at 1000° C. under air for 2 hours. The calcined $SnO_2$ was suspended in a round-bottom flask in a solution of commercial 0.2577 g of ruthenium chloride n-hydrate in 1.5 g of water and stirred at room temperature for 60 min. The excess solution was concentrated at 60° C. overnight. The resulting solid was subsequently calcined in an air stream at 250° C. for 16 h, which afforded a ruthenium chloride catalyst supported on calcined $SnO_2$. The amount of ruthenium supported corresponds to a proportion of 2.01% by weight.

Example 2

Inventive 5 g of a catalyst corresponding to example 1 were prepared, except that the $SnO_2$ support, prior to application of the ruthenium chloride, was calcined at 500° C. under air for 4 h.

Example 3

Comparative Example 5 g of a catalyst corresponding to example 1 were prepared, except that the $SnO_2$ support, prior to application of the ruthenium chloride, was not calcined

Catalyst Test Example 4

Inventive

Use of the Catalyst from Example 1 in HCl Oxidation

A gas mixture of 80 ml/min (standard conditions, STP) of hydrogen chloride and 80 ml/min (STP) of oxygen flowed through 0.2 g of the pulverulent catalyst according to Example 1 in a fixed bed in a quartz reaction tube (internal diameter 10 mm) at 300° C. The quartz reaction tube was heated by an electrically heated fluidized sand bed. After 30 min, the product gas stream was passed into 16% by weight potassium iodide solution for 15 min. The iodine formed was then back-titrated with 0.1 N standard thiosulfate solution in order to determine the amount of chlorine introduced. A chlorine formation rate of 1.96 $kg_{Cl2}/kg^{CAT}$·h was measured.

Catalyst Test Example 5

Inventive

Use of the Catalyst from Example 2 in HCl Oxidation 0.2 g of the pulverulent catalyst according to example 2 were tested in accordance with catalyst test example 4. A chlorine formation rate of 1.66 $kg_{CAT}$·h was measured.

Catalyst Test Example 6

Comparative Example

Use of the Catalyst from Example 3 in HCl Oxidation 0.2 g of the pulverulent catalyst according to example 3 were tested in accordance with catalyst test example 4. A chlorine formation rate of 1.44 $kg_{Cl2}/kg_{CAT}$·h was measured.

Example 7

Inventive 5 g of a catalyst corresponding to example 1 were prepared, except using another commercial $SnO_2$ powder (nano-$SnO_2$; manufacturer: Sigma-Aldrich). After calcination at 1000° C. for 2 h, a BET surface area of 9.3 $m^2/g$ was measured.

Example 8

Comparative Example 5 g of a catalyst corresponding to example 3 were prepared, except using another commercial $SnO_2$ powder (nano-$SnO_2$; manufacturer: Sigma-Aldrich) with a BET of 20 $m^2/g$ as obtained.

Catalyst Test Example 9

Inventive

Use of the Catalyst from Example 7 in HCl Oxidation 0.2 g of the pulverulent catalyst according to example 7 were tested in accordance with catalyst test example 4. A chlorine formation rate of 3.8 $kg_{Cl2}/kg_{CAT}$·h was measured.

Catalyst Test Example 10

Comparative Example

Use of the Catalyst from Example 8 in HCl Oxidation 0.2 g of the pulverulent catalyst according to example 8 were tested in accordance with catalyst test example 4. A chlorine formation rate of 2.3 $kg_{Cl2}/kg_{CAT}$·h was measured.

Example 11

Inventive

Supporting of Ruthenium Chloride on Calcined $SnO_2$ Shaped Bodies 100 g of spherical $SnO_2$ shaped bodies (commercial $SnO_2$, manufacturer: Alfa-Aesar, shaping by Saint-Gobain) with a proportion of 15% by weight of $Al_2O_3$ having an average diameter of 1.5 mm were calcined at 915° C. for 4 h and then impregnated with a solution of 5.2535 g of commercial ruthenium chloride n-hydrate in 16.7 g of $H_2O$. After standing for 1 h, the catalyst was dried in an air stream at approx. 60° C. within 6 h. Subsequently, the catalyst was calcined at 250° C. for 16 h. This gives a catalyst calculated to have 2% by weight of ruthenium.

Example 12

Comparative Example

Supporting of Ruthenium Chloride on Uncalcined $SnO_2$ Shaped Bodies 100 g of catalyst were prepared in accordance with example 11, except that the support was used in uncalcined form.

Catalyst Test Example 13

Inventive

Use of the Catalyst from Example 11 in HCl Oxidation 25 g of the catalyst according to example 11 were installed together with 75 g of inert material (glass beads) in a nickel fixed bed reactor (diameter 22 mm, length 800 mm) heated with an oil bath. This afforded a fixed bed of approx. 150 mm. The fixed bed was heated by means of a heat carrier heated to 350° C. At a pressure of 4 bar, a gas mixture of 40.5 l/h (STP) of hydrogen chloride, 157.5 l/h (STP) of oxygen and 252 l/h (STP) of nitrogen flowed through the fixed bed reactor. After a defined reaction time (for example 30 min), the product gas stream was passed into 16% potassium iodide solution for 5 min. The iodine formed was then back-titrated with 0.1 N standard thiosulfate solution in order to determine the amount of chlorine introduced. The conversion calculated therefrom was 92.8%. After a run time of 240 min, a condensed reaction sample was analyzed for the Sn content by means of ICP-OES (Inductively Coupled Plasma-Optical Emission Spectrometry, instrument: Varian Vista-PRO, method according to manufacturer's instructions). The analyzed value was 88 ppm.

Catalyst Test Example 14

Comparative Example

Use of the Catalyst from Example 12 in HCl Oxidation 25 g of the catalyst according to Example 12 were tested analogously to catalyst test example 13. A conversion of 89.4% and an Sn content of 359 ppm were measured.

Example 15

Inventive

Supporting of Ruthenium Chloride on Calcined SnO$_2$ Shaped Bodies 50 g of spherical SnO$_2$ shaped bodies (manufacturer: Saint-Gobain, source: commercial nano-SnO$_2$ from Sigma-Aldrich) with a proportion of 15% by weight of Al$_2$O$_3$ as a binder having an average diameter of 1.5 mm, after the shaping, were calcined at 550° C. for 2 h. This afforded a support having a BET surface area of 53 m$^2$/g. The support was subsequently impregnated with a solution of 2.575 g of commercial ruthenium chloride n-hydrate in 7.08 g of H$_2$O. After standing for 1 h, the catalyst was dried in an air stream at approx. 60° C. within 6 h. Subsequently, the catalyst was calcined at 250° C. for 16 h. This gives a catalyst calculated to have 2% by weight of ruthenium.

Example 16

Inventive

Supporting of Ruthenium Chloride on Calcined SnO$_2$ Shaped Bodies 50 g of catalyst were prepared in accordance with example 15, except that the support was used after calcination at 1000° C. for 2 h. This afforded a support having a BET surface area of 25 m$^2$/g.

Catalyst Test Example 17

Inventive

Use of the Catalyst from Example 15 in HCl Oxidation 0.2 g of the catalyst according to example 15 were ground to powder and tested in accordance with catalyst test example 4. A chlorine formation rate of 2.15 kg$_{Cl2}$/kg$_{CAT}$·h was measured.

Catalyst Test Example 18

Inventive

Use of the Catalyst from Example 16 in HCl Oxidation 0.2 g of the catalyst according to example 16 were ground to powder and tested in accordance with catalyst test example 4. A chlorine formation rate of 2.4 kg$_{Cl2}$/kg$_{CAT}$·h was measured.

Catalyst Test Example 19

Inventive

Use of the Catalyst from Example 16 in HCl Oxidation 25 g of the catalyst according to example 16 were tested analogously to catalyst test example 13, with the difference that the volume flow rates were 40.5 l/h (STP) of HCl, 315.0 l/h (STP) of O2 and 94.5 l/h (STP) of N2. The analysis for tin in the condensate (sample after run time 300 min) was conducted by means of ICP-OES (Inductively Coupled Plasma-Optical Emission Spectrometry, instrument: Varian Vista-PRO, method according to manufacturer's instructions). The condensate sample contains 91 ppm of Sn.

The essential indices and results from the examples adduced are summarized in the table below.

| Prep. ex. # | Source | Form | Calc. time ° C. | BET m$^2$/g | Test ex. # | STY kg/kg * h | Sn output ppm |
|---|---|---|---|---|---|---|---|
| 1 | CFM | powder | 1000 | | 4 | 1.96 | |
| 2 | CFM | powder | 500 | | 5 | 1.66 | |
| 3 (comp.) | CFM | powder | n.c. | | 6 (comp.) | 1.44 | |
| 7 | Aldrich | powder | 1000 | 9.3 | 9 | 3.80 | |
| 8 (comp.) | Aldrich | powder | n.c. | 20 | 10 (comp.) | 2.30 | |
| 11 | Alfa | shaped bodies | 915 | | 13 | | 88 |
| 12 (comp.) | Alfa | shaped bodies | n.c. | | 14 | | 359 |
| 15 | Aldrich | ground shaped bodies | 550 | 53 | 17 | 2.15 | |
| 16 | Aldrich | ground shaped bodies | 1000 | 25 | 18 | 2.40 | |
| 16 | Aldrich | shaped bodies | 1000 | 25 | 19 | | 91 | n.c. = not calcined,
STY = space-time yield (chlorine formation rate)

CONCLUSIONS

Catalyst test examples 4-6 show that calcination of the tin dioxide used in powder form at 500° C. leads to a rise, and calcination at 1000° C. to a considerable rise, in the activity of the catalyst prepared therewith in the HCl oxidation. Catalyst test examples 9 and 10 show that an inventive calcination of the tin dioxide used in powder form leads to a considerable rise in the activity of the catalyst prepared therewith in the HCl oxidation, even though the BET surface area declines in the course of this calcination. Catalyst test examples 13 and 14 show that an inventive calcination of the tin dioxide shaped bodies used leads to a considerable rise in the chemical stability of the support (reduction in the tin output) in the HCl oxidation. Catalyst test examples 17-18 show that, under the calcination conditions selected, the activity can be enhanced even though the BET surface area decreases. In addition, as shown by catalyst test example 19, the catalyst according to example 16 shows a very low tin output.

A high tin output can entail problems with the mechanical stability of the catalyst given the industrially favored run times of >=2 years. Generally: the lower the tin output, the lower the cost and inconvenience of the removal.

Current teaching states that high dispersion of a noble metal component is desirable. This is usually established via supports with large BET surface areas and sometimes complicated application methods. In this respect, it is particularly surprising that, in spite of the reduction in the BET surface area of the support by the inventive calcination, the activity of the catalysts prepared therewith in the HCl oxidation rises.

The invention claimed is:

1. A catalyst composition comprising tin dioxide as a support material and a ruthenium-containing compound as a catalytically active material, wherein the support material has been subjected, prior to the application of the catalytically active material, to a calcination in the presence of oxidizing gases at a temperature of at least 450° C., wherein the tin dioxide is more than 90% in the cassiterite structure.

2. The composition of claim 1, wherein the ruthenium-containing compound is a halogen- and/or oxygen-containing ruthenium compound.

3. The composition of claim 2, wherein the halogen in the ruthenium-containing compound is selected from the group consisting of chlorine, bromine, and iodine.

4. The composition of claim 2, wherein the catalyst composition is obtained by calcining the support material laden with a halogen-containing ruthenium compound at a temperature of at least 200° C.

5. The composition of claim 4, wherein the proportion of ruthenium from the halogen-containing ruthenium compound in relation to the overall catalyst composition is 0.5 to 5% by weight.

6. The composition of claim 1, wherein the catalytically active ruthenium-containing compound is selected from the group consisting of ruthenium chloride, ruthenium oxychloride, and mixtures of ruthenium chloride and ruthenium oxide.

7. The composition of claim 6, wherein the catalytically active ruthenium-containing compound is a mixed compound corresponding to the formula $RuCl_xO_y$ wherein x is a number from 0.8 to 1.5 and y is a number from 0.7 to 1.6.

8. The composition of claim 1, wherein the temperature in the course of calcination of the support material prior to application of the catalytically active material is at least 500° C.

9. The composition of 1, wherein the duration of calcination of the support material prior to application of the catalytically active material has been conducted over 0.5 to 10 hours.

10. The composition of claim 1, wherein the oxidizing gases in the calcination of the support material prior to application of the catalytically active material have an oxygen content in the range of from 10% by volume to 50% by volume.

11. The composition of claim 1, wherein the catalyst is obtained by a process comprising removing solvent by drying at a temperature of at least 80° C.

12. A process for preparing chlorine comprising the step of catalytically oxidizing hydrogen chloride in the gas phase with oxygen over a solid catalyst, wherein the catalyst is the composition of claim 1.

13. The process of claim 12, wherein the catalytically oxidizing hydrogen chloride in the gas phase comprises passing a gas comprising hydrogen chloride and oxygen at a temperature of 180 to 500° C. and the chlorine formed is separated from the water of reaction and any unconverted oxygen and hydrogen chloride.

14. The process of claim 12, wherein the catalytically oxidizing hydrogen chloride in the gas phase is conducted at a pressure of 1 to 25 bar.

15. The process of claim 12, wherein the gas phase oxidation is conducted adiabatically or isothermally.

16. A process for preparing a catalyst comprising calcining a tin dioxide containing support material in the presence of an oxidizing gas at a temperature of at least 450° C. and applying at least one ruthenium-containing compound as a catalytically active material to the calcined tin dioxide containing support material, wherein the tin dioxide is more than 90% in the cassiterite structure.

17. The process of claim 16, wherein the calcining time is from 30 min to 24 hours.

* * * * *